J. W. FITZGERALD.
COUPLING PLATE FOR STORAGE BATTERIES.
APPLICATION FILED NOV. 24, 1919.
1,359,585. Patented Nov. 23, 1920.
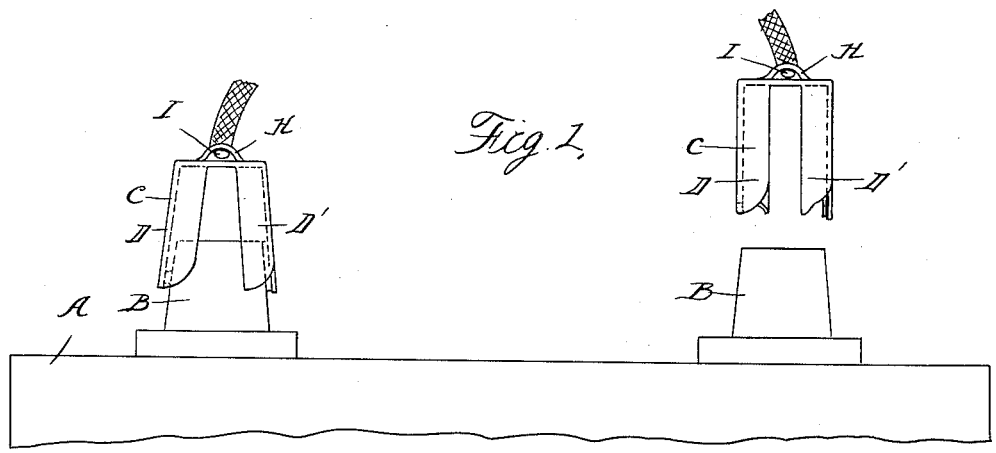
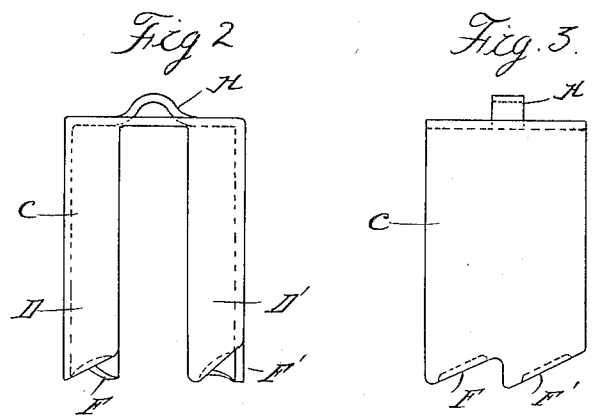 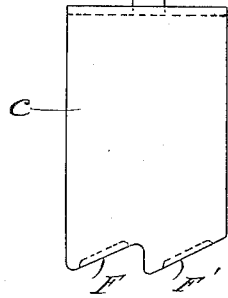 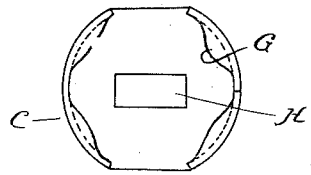
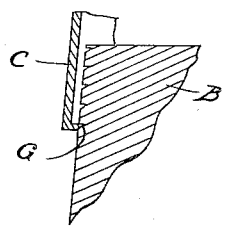
Inventor
John W. Fitzgerald
By Whittemore, Hulbert & Whittemore
Attorneys

UNITED STATES PATENT OFFICE.

JOHN W. FITZGERALD, OF DETROIT, MICHIGAN, ASSIGNOR TO F. B. ELECTRIC & MANUFACTURING COMPANY, OF DETROIT, MICHIGAN, A CORPORATION OF MICHIGAN.

COUPLING-PLATE FOR STORAGE BATTERIES.

1,359,585.

Specification of Letters Patent.  Patented Nov. 23, 1920.

Application filed November 24, 1919.  Serial No. 340,148.

*To all whom it may concern:*

Be it known that I, JOHN W. FITZGERALD, a citizen of the United States of America, residing at Detroit, in the county of Wayne and State of Michigan, have invented certain new and useful Improvements in Coupling-Plates for Storage Batteries, of which the following is a specification, reference being had therein to the accompanying drawings.

The invention relates to storage batteries and more particularly to a construction of clip, by means of which the battery cells may be connected into circuit for charging. It is the object of the invention to obtain a construction which can be quickly applied and detached, which will form a good electrical connection and will not injure the terminal or become accidentally disengaged therefrom.

In the drawings:

Figure 1 is an elevation of a storage battery showing my improved clip in engagement with one of the terminals and disengagement from another terminal;

Figs. 2, 3 and 4 are respectively side elevations and a bottom plan view of the clip.

Fig. 5 is a sectional view in elevation illustrating the cutting engagement of the clip with the battery terminal.

In the manufacture of storage batteries it is usual to provide lead terminal posts which are of a tapering form adapted to fit correspondingly tapered clamping sockets. When a battery is to be charged, it is desirable to provide means for quickly connecting it into circuit without the necessity of using a clamp. Inasmuch, however, as the voltage is low and the terminals are frequently corroded or coated with lead sulfate, it is difficult to obtain good electrical connection. My improvement consists in a clip having yieldable resilient jaws with a spiral cutting edge which may be screwed upon the post. This will accomplish the double purpose of cutting through the corrosion into contact with the bright metal and will also expand the clip so as to place the same under tension.

As shown, A is a battery cell, and B B' are the terminal posts projecting outward therefrom. C are clips of my improved construction which are preferably drawn or pressed from sheet metal having the oppositely arranged cylindrical segmental portions D and D' connected by an end portion E. The ends of the segmental portions D and D' are cut to form inclines F F', and the metal is turned inward and sharpened to form a cutting edge G. For connecting the clip to the terminal conductor a loop H is struck up from the end portion E, which may be engaged by the end of the conductor I, as shown in Fig. 1.

In use, the clip is normally of a diameter permitting of engagement with the small end of the tapered post and by then rotating the clip, it will be screwed downward onto the larger portion of the post, thereby extending the segments and placing the same under resilient tension. The spiral movement is caused by the inclined arrangement of the cutting blades F and F' and these blades being sharpened will cut through any corrosion or coating and form electrical connections with the bright metal. To disengage the clip it is screwed in the reverse direction, the blades G following the spiral previously cut. There will not, however, be any tendency for the clip to accidentally disengage and a considerable pull on the conductor may be exerted without displacement.

What I claim as my invention is:

1. A connector clip for storage batteries, comprising portions for engaging diametrically opposite sides of a smooth surfaced terminal post, and means operable on the rotation of said clip for causing said engaging portions to move spirally inward on said post.

2. A connector clip comprising a resilient member having segmental portions for embracing opposite sides of a smooth surfaced terminal post, and means also engaging said post for forcing said embracing portions inward relative to said post and against tension of said resilient member.

3. A connector clip comprising a return-bent resilient member having segmental portions for engaging opposite sides of a smooth surfaced terminal post, and means adapted to form a spiral engagement with said terminal post for forcing said segmental members inward thereon.

4. A connector clip comprising a member for embracing the terminal post and having a rotating engagement therewith, said member being provided with an inwardly extending portion having a knife edge for cutting through the coating into the bright metal of the post.

5. A connector clip comprising a member provided with resiliently yieldable jaws for embracing opposite sides of the terminal post, and inturned portions on said jaws having knife edges inclined to cut spirally into the post upon the rotation of the clip.

6. A connector clip comprising a pressed sheet metal member having opposite segmental portions for embracing the terminal post, and inturned portions having knife edges inclined to cut spirally into the post upon the rotation of said member.

7. The combination with a tapering terminal post, of a connector clip therefor formed of pressed sheet metal and having segmental portions on opposite sides thereof for embracing said post, and inturned portions having knife edges inclined to cut spirally into the post upon the rotation of said clip and thereby to expand said jaws.

8. A connector clip comprising a resilient member having portions for embracing opposite sides of a smooth surfaced terminal post, and means on said portions for cutting spirally into said terminal post upon rotation of said clip.

In testimony whereof I affix my signature.

JOHN W. FITZGERALD.